US008345305B2

(12) United States Patent
Enomoto (10) Patent No.: US 8,345,305 B2
(45) Date of Patent: Jan. 1, 2013

(54) IMAGE-PROCESSING DEVICE AND IMAGE-PROCESSING METHOD (75) Inventor: Naoyuki Enomoto, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 440 days.

(21) Appl. No.: 12/633,504

(22) Filed: Dec. 8, 2009

(65) Prior Publication Data
US 2010/0328685 A1 Dec. 30, 2010

(30) Foreign Application Priority Data
Jun. 24, 2009 (JP) ................................. 2009-150302

(51) Int. Cl.
G06K 15/02 (2006.01)
G06K 9/46 (2006.01)
G06F 17/00 (2006.01)

(52) U.S. Cl. ........ 358/1.2; 358/1.5; 358/1.11; 358/1.12; 358/1.13; 358/1.15; 358/1.17; 358/1.18; 382/190

(58) Field of Classification Search .......................... None
See application file for complete search history.

(56) References Cited

U.S. PATENT DOCUMENTS

| 2004/0179236 A1* | 9/2004 | Ferlitsch et al. ............. 358/1.18 |
| 2007/0036468 A1* | 2/2007 | Matsushita et al. ........... 382/305 |
| 2008/0246975 A1* | 10/2008 | Poxon et al. ................... 358/1.1 |
| 2010/0329567 A1* | 12/2010 | Tanaka .......................... 382/190 |
| 2011/0229035 A1* | 9/2011 | Sohma et al. ................. 382/176 |

FOREIGN PATENT DOCUMENTS

| JP | 11-007493 A | 1/1999 |
| JP | 2000-182055 A | 6/2000 |
| JP | 2005-115573 A | 4/2005 |

* cited by examiner

Primary Examiner — Satwant Singh
(74) Attorney, Agent, or Firm — Sughrue Mion, PLLC (57) ABSTRACT An image-processing device includes: an acquiring unit that acquires image data representing a document which includes a plurality of pages; an extracting unit that extracts, from the acquired image data, a character area in a first page that is at least one of the plurality of pages; and an output unit that outputs first partial image data within the extracted character area associated with the acquired image data of a second page other than the first page, the second page determined by having a character area corresponding to the extracted character area in the first page.

11 Claims, 5 Drawing Sheets

1410
| LEDGER SHEET NAME |
|---|
| DELIVERY TABLE A |
| DELIVERY TABLE B |
| BILLING STATEMENT A |
| BILLING STATEMENT B |

1411
| | RECORDING-AREA IDENTIFICATION INFORMATION | RECORDING-AREA POSITION INFORMATION | | ATTACH-TO DESTINATION INFORMATION | |
|---|---|---|---|---|---|
| NUMBER | TAG NAME | X-COORDINATE | Y-COORDINATE | | |
| 1 | NAME | 500,1500 | 250,375 | 1 | 2 |
| 2 | ADDRESS | 500,1500 | 500,625 | 2,3 | 2 |
| 3 | TELEPHONE NUMBER | 500,1500 | 625,750 | 2 | — |
| 4 | NAME OF DELIVERY DESTINATION | 500,1500 | 875,1000 | 2 | — |
| 5 | ADDRESS OF DELIVERY DESTINATION | 500,1500 | 1000,1125 | 2 | — |
| 6 | PHONE NUMBER OF DELIVERY DESTINATION | 500,1500 | 1125,1250 | 2 | — |
| 7 | GOODS | 1000,1500 | 1375,1500 | 3 | — |
| 8 | NUMBER OF UNITS | 1000,1500 | 1500,1625 | 3 | — |
| 9 | FEE | 1000,1500 | 1625,1750 | 3 | — |
| 10 | CONFIRMATION | 1000,1500 | 1875,2000 | 3 | — |

1412
| PAGE NUMBER | SEND-TO DESTINATION INFORMATION | SENDING AREA INFORMATION |
|---|---|---|
| 1 | 2A | 1,10 |
| 2 | 2B | 1 |
| 3 | 2C | 10 |

| | | 1/3 | B1, B10 |
|---|---|---|---|
| NAME | ICHIRO FUJI | | B111, B110 |

| ADDRESS | CITY A, TOWN B, X-X-X | B121 |
|---|---|---|
| PHONE NUMBER | XXX-XXX-XXX | B122 |

| DELIVERY DESTINATION | JIRO FUJI | B131 |
|---|---|---|
| ADDRESS | CITY C, TOWN D, Y-Y-Y | B132 |
| PHONE NUMBER | YYY-YYY-YYY | B133 |

| GOODS | BOX | B141 |
|---|---|---|
| NUMBER OF UNITS | 1 | B142 |
| FEE | 1,050 YEN | B143 |

| CONFIRMATION | SABURO FUJI | B151, B150 |
|---|---|---|

*FIG. 5*

| | | 2/3 | B2, B20 |
|---|---|---|---|
| NAME | ICHIRO FUJI | | B211, B210 |

| ADDRESS | CITY A, TOWN B, X-X-X | B221 |
|---|---|---|
| PHONE NUMBER | XXX-XXX-XXX | B222 |

| DELIVERY DESTINATION | JIRO FUJI | B231 |
|---|---|---|
| ADDRESS | CITY C, TOWN D, Y-Y-Y | B232 |
| PHONE NUMBER | YYY-YYY-YYY | B233 |

IMAGE-PROCESSING DEVICE AND IMAGE-PROCESSING METHOD

CROSS-REFERENCE TO RELATED APPLICATIONS

This application is based on and claims priority under 35 USC 119 from Japanese Patent Application No. 2009-150302 filed on Jun. 24, 2009.

BACKGROUND

1. Technical Field

The present invention relates to an image-processing device and an image-processing method.

2. Related Art

Ledger sheets for handwritten entries, such as account ledgers and expense sheets include those made of pressure sensitive paper, such as non-carbon paper. Such ledger sheets are referred to as "duplicate vouchers" and are made up of multiple sheets of pressure sensitive paper layered together. When characters are entered on a duplicate voucher using a fountain pen, a ballpoint pen, or the like, pressure from the pen is also applied to the pages layered below the page on which the entry has been made whereby the entered characters are duplicated. Using a duplicate voucher makes it easy to prepare original documents and copies, but there is a possibility that characters duplicated on the copies may be or may become illegible. Technologies that assign an appropriate format to a page when using a scanner to read a multipage document and read the entered details have been disclosed.

SUMMARY

According to an aspect of the invention, there is provided an image-processing device including: an acquiring unit that acquires image data representing a document which includes a plurality of pages; an extracting unit that extracts, from the acquired image data, a character area in a first page that is at least one of the plurality of pages; and an output unit that outputs first partial image data within the extracted character area associated with the acquired image data of a second page other than the first page, the second page determined by having a character area corresponding to the extracted character area in the first page.

BRIEF DESCRIPTION OF THE DRAWINGS

Exemplary embodiment of the present invention will be described in detail based on the following figures, wherein.

DETAILED DESCRIPTION

1. Definitions

The following is an explanation of the terminology.

"Format" refers to a predetermined composition for a ledger sheet that indicates the arrangement and positions of areas formed by ruled lines, enclosing lines, and the like drawn on the ledger sheet. In these areas, for example, characters are entered by use of a writing instrument, such as a pen, or seal impressions are made by application of a personal seal.

"Format information" refers to information representing the format of a ledger sheet and to related information and contains numerical values indicating the positions and the like of the above-mentioned areas, tags indicating the purpose of each area, and the usage relationships of the areas of each page.

"Recording area" refers to an area that is defined by the format information and in which characters are entered.

2. Configuration

The following is a description of the configuration of image-processing system 9, an exemplary embodiment of the present invention.

2-1. Overall Configuration

Figure 1:
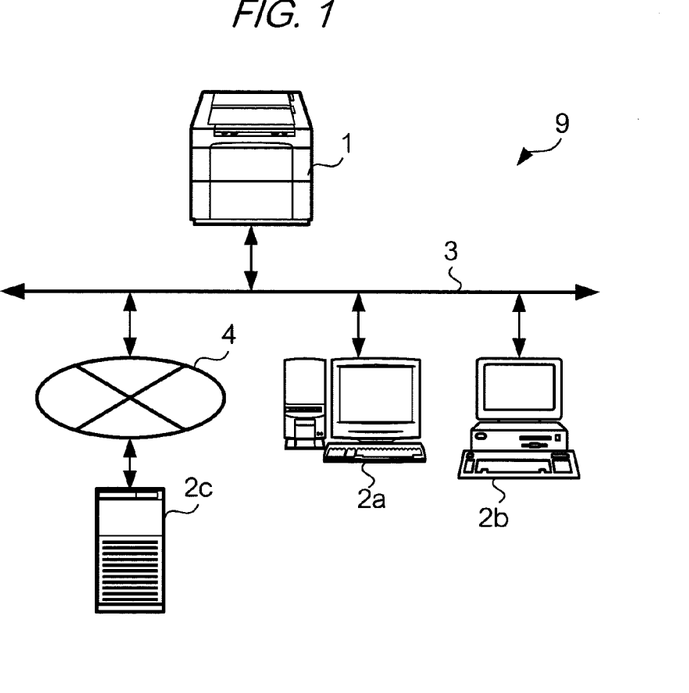
FIG. 1 is a diagram showing the overall configuration of an image-processing system.

FIG. 1 is a diagram showing the overall configuration of image-processing system 9. Image-processing device 1 exchanges information with external processing devices 2a, 2b, 2c (hereinafter collectively referred to as "external processing device 2" when there is no need to differentiate the devices) through local network 3 and communication network 4, which is the Internet or the like.

2-2. Configuration of an Image-Processing Device

Figure 2:
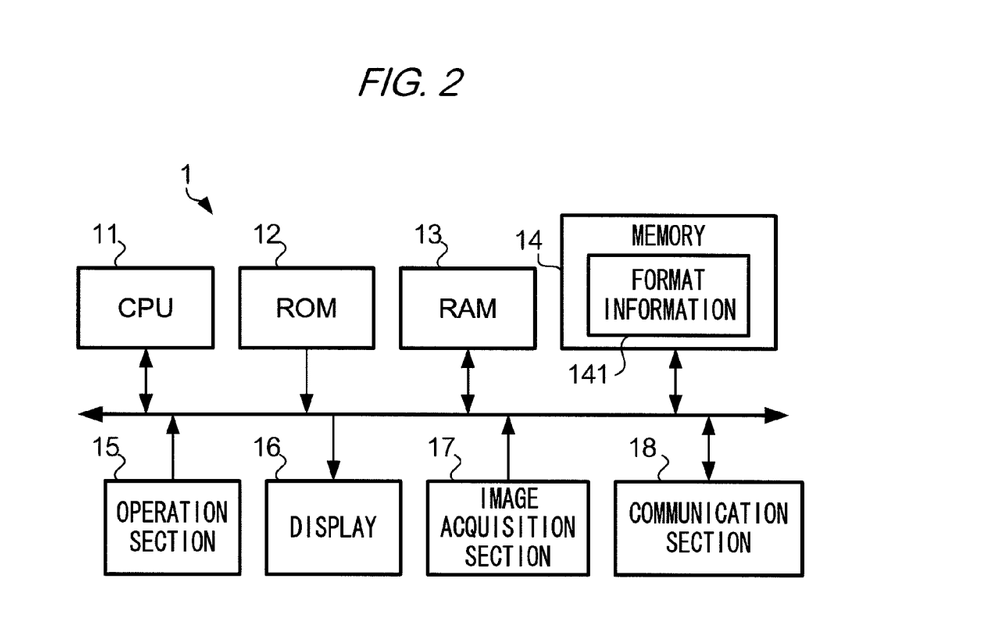
FIG. 2 is a block diagram showing the overall configuration of an image-processing device.

FIG. 2 is a block diagram showing the overall configuration of image-processing device 1. CPU (central processing unit) 11 reads and executes boot loaders stored in ROM (read-only memory) 12 and computer programs stored in memory 14 to control each section of image-processing device 1. ROM 12 is a read-only nonvolatile storage device composed of semiconductor elements and the like. ROM 12 stores a boot loader for loading an OS (Operating System) stored in memory 14 onto RAM (Random Access Memory) 13 along with a BIOS (Basic Input/Output System) and the like. RAM 13 is used as a work area when CPU 11 executes a program. Memory 14 is a nonvolatile storage device, such as a hard disk drive or an EEPROM (Electrically Erasable Programmable Read Only Memory), and stores programs read into CPU 11. Memory 14 also stores format information 141 of a ledger sheet. The details of format information 141 shall be described later.

Operating section 15 includes arrows keys, buttons, and the like for inputting various instructions and accepts operations performed by a user, and supplies signals corresponding to details of the operations to CPU 11. Display 16 includes, for example, a liquid crystal display and displays images corresponding to instructions from CPU 11. Image acquisition section 17 is a device that acquires image data representing a ledger sheet, such as, for example, a scanner that optically reads images drawn on a medium to generate image data corresponding to the images. Communication section 18 includes, for example, various modems and wireless communication circuits, serial interfaces, and wireless interfaces, and exchanges data with external equipment.

2-3. Configuration of Format Information

Figure 3:
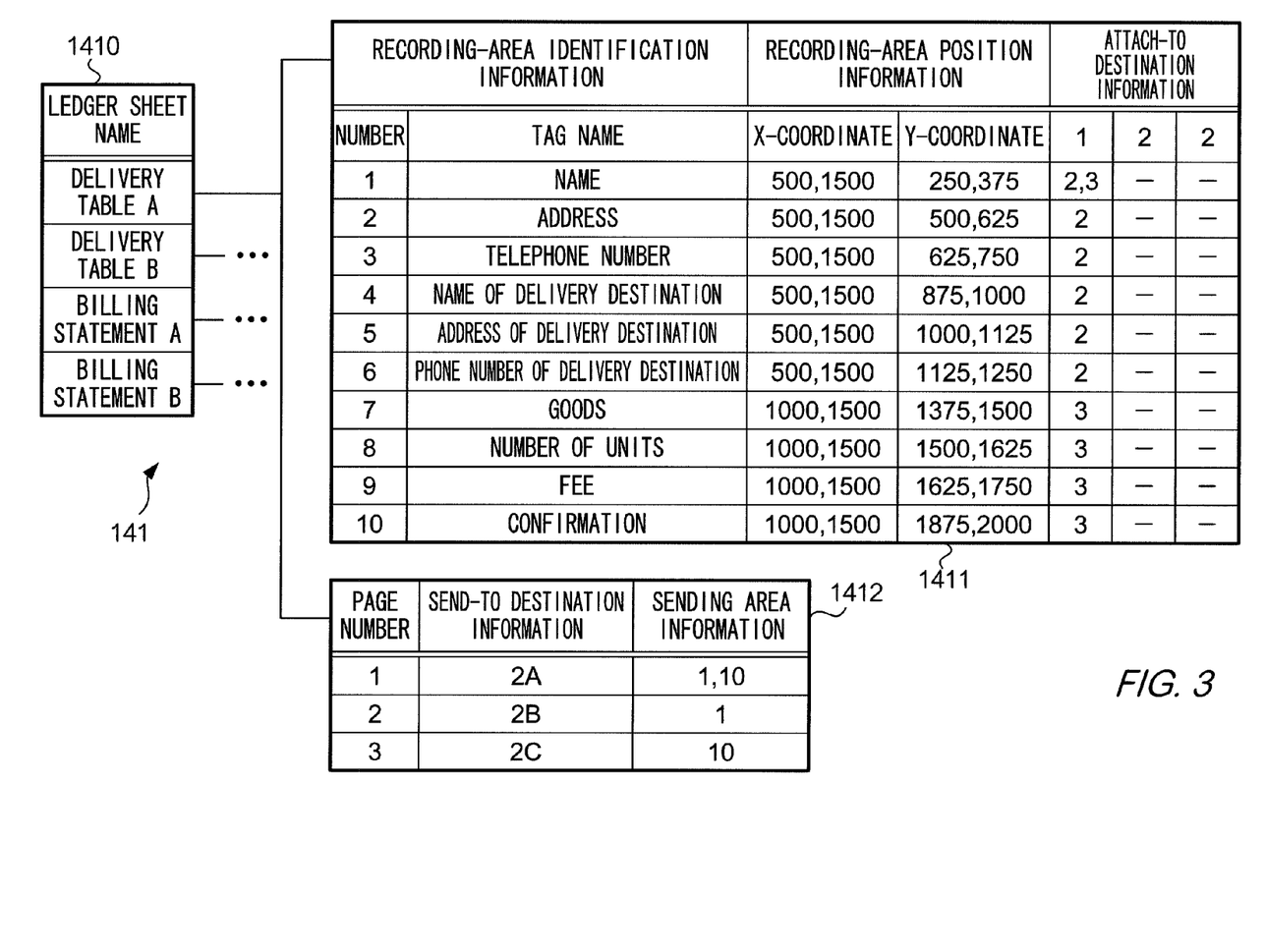
FIG. 3 is a diagram showing the configuration of format information stored in a memory.

FIG. 3 is a diagram showing the configuration of format information 141 stored in memory 14. Format information 141 stores information for each ledger sheet name, which is a designation of a ledger sheet. List of ledger sheet names 1410 lists the ledger sheet names of all of the ledger sheets stored in format information 141 and separates the information stored in format information 141 for each ledger sheet. Information is described in table of area definitions 1411 and table of send-to destination definitions 1412 for each ledger sheet name described in list of ledger sheet names 1410. In table of area definitions 1411, "recording-area identification information" that is information for identifying a recording area on a ledger sheet, "recording-area position information" that indicates the position of the recording area, and "attach-to destination information" that indicates the page to which character information generated based on the recording area is attached are associated and described for each recording area. The recording-area identification information is information containing the number of the recording area and tag names indicating the purpose of the recording area. The recording-area position information is information describing two x-coordinates and two y-coordinates that define the rectangular shape of a recording area. The attach-to destination information describes, for all of the pages of a ledger sheet, the page numbers of non-specified pages to which each item of character information is attached when a single page is defined as a specified page. The attach-to destination information is determined for each recording area of the specified page. In other words, the attach-to destination is determined by having the recording areas corresponding to the recording areas in the specified page.

Table of send-to destination definitions 1412 describes, for each page, "send-to destination information" that indicates the identification information of external processing device 2, which is the send-to destination to which the image data of the page is sent, and "sending area information" that indicates the area sent to the send-to destination from the image data of the page.

When "2, 3" is described in the attach-to destination information as shown in FIG. 3, this indicates that the attach-to destinations for the recording area are pages 2 and 3, and when "-" is described in the attach-to destination information, this indicates that there is no attach-to destination. Moreover, in the example shown in FIG. 3, the send-to destination of the first page of the ledger sheet, for example, is external processing device 2*a*, which is indicated by the description "2A" in the send-to destination information corresponding to page 1. The send-to destination information is information identifying an output destination determined according to the page and specifically includes the IP address of an external processing device, an E-mail address associated with an external processing device, or the like.

In concrete terms, the character information is generated by combining character strings extracted from character image data through the character recognition process with tag names. For example, when the character string "Ichiro Fuji" is generated from image data representing an image of a target recording area and the tag name "Name" is acquired associated with the recording area, CPU 11 of image-processing device 1 combines this information to generate the character information "<Name>Ichiro Fuji<Name>".

2-4. Composition of a Ledger Sheet

Figure 4:
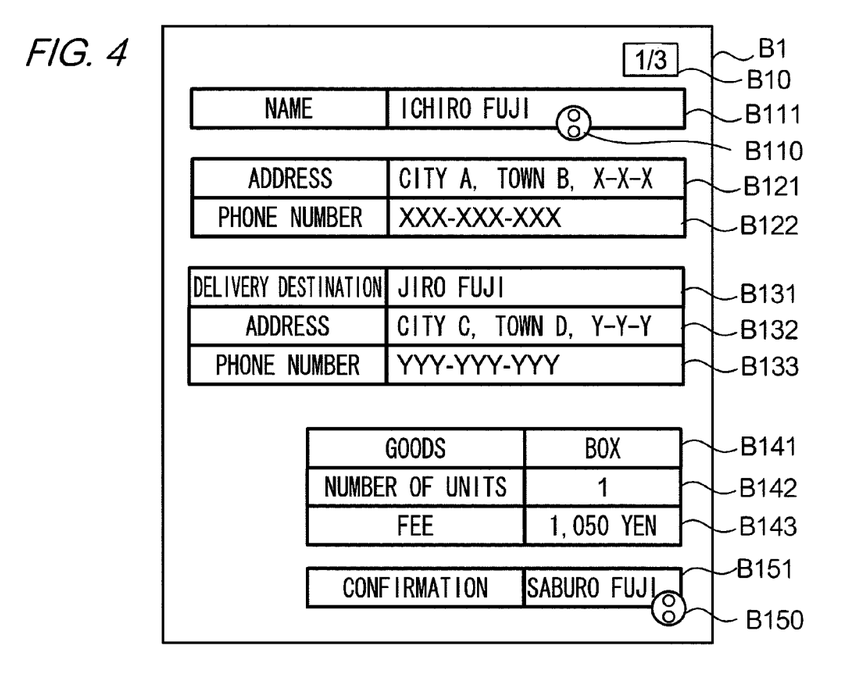
FIG. 4 is a diagram showing an example of the first page of a ledger sheet to be read by the image-processing device.

FIG. 4 is a diagram showing an example of a first page of a ledger sheet read by image-processing device 1. On page B1, which is the first page of the ledger sheet, recording areas B111, B121, B122, recording areas B131, B132, B133, recording areas B141, B142, B143, and a recording area B151 are set. In recording areas B111, B121, B122, the name, address, and phone number, respectively, of the sender are entered. In recording areas B131, B132, B133, the name, address, and phone number, respectively, of the delivery destination are entered. In recording areas B141, B142, B143, the name of the goods to be delivered, the number of units to be delivered, and the fee required for delivery, respectively, are entered. In a recording area B151, the signature of a confirming party is entered. Seal areas B110, B150 are areas where seal impressions are made and are superimposed over recording areas B111, B151, respectively. In addition, in page display area B10, the page number and the total number of pages of the ledger sheet are displayed in advance.

Figure 5:
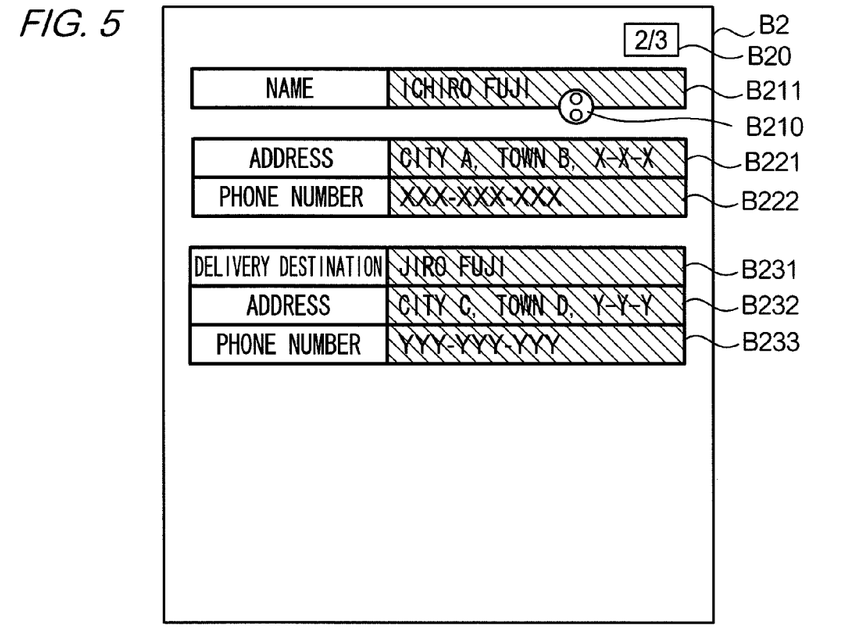
FIG. 5 is a diagram showing an example of the second page of the ledger sheet.

FIG. 5 is a diagram showing an example of a second page of the ledger sheet. On page B2, which is the second page of the ledger sheet, recording areas B211, B221, B222, B231, B232, B233 are set at positions respectively corresponding to recording areas B111, B121, B122, B131, B132, B133. When a user makes an entry in the ledger sheet, page B1 is layered above the areas indicated with diagonal lines in the diagram. The areas of page B1 corresponding to these areas are made from pressure sensitive paper. Consequently, the characters entered on page B1 are duplicated in these areas on page B2. In addition, in page display area B20, the page number and the total number of pages of the ledger sheet are displayed in advance.

Figure 6:
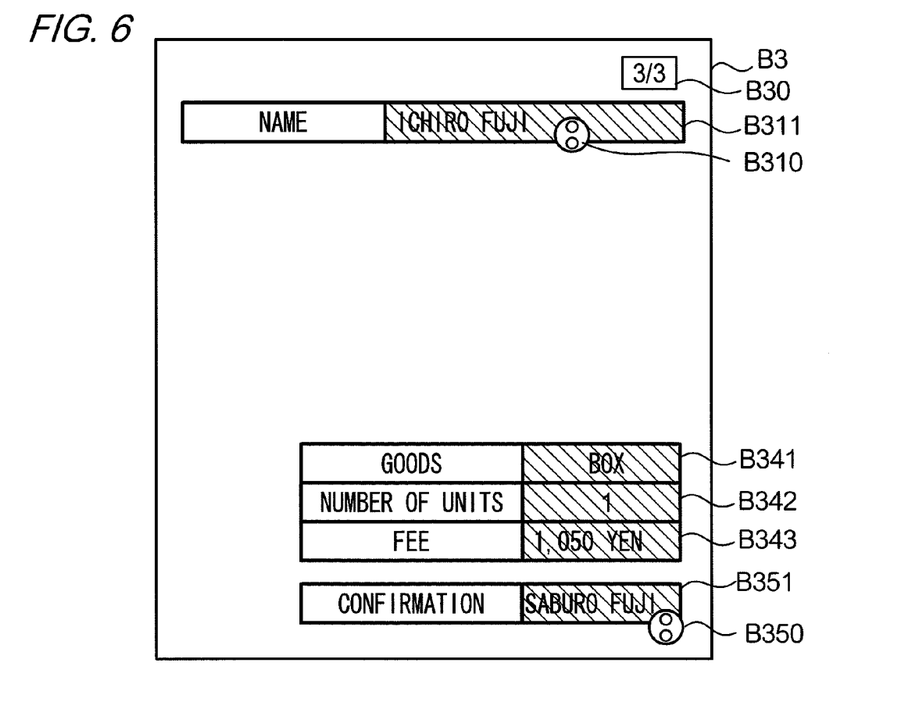
FIG. 6 is a diagram showing an example of the third page of the ledger sheet.

FIG. 6 is a diagram showing an example of a third page of the ledger sheet. On page B3, which is the third page of the ledger sheet, recording areas B311, B341, B342, B343, B351 are set at positions respectively corresponding to recording areas B111, B141, B142, B143, B151. When the user makes an entry in the ledger sheet, page B2 is layered over page B3 and page B1 is layered over page B2. The areas of page B2, which is layered over page B3, corresponding to the areas indicated with diagonal lines in the diagram, are made from pressure sensitive paper. Consequently, characters entered on page B1 are duplicated on these areas on page B3 through page B2. In addition, in page display area B30, the page number and the total number of pages of the ledger sheet are displayed in advance.

Figure 7:
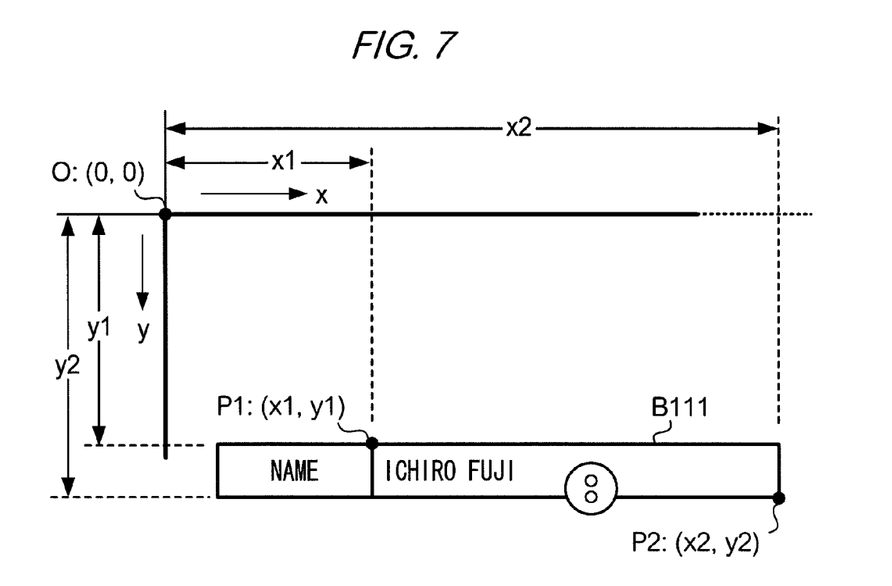
FIG. 7 is a diagram for describing the definitions of recording-area position information representing the position of a recording area.

FIG. 7 is a diagram for describing the definitions of recording-area position information representing the position of a recording area. Point O in the diagram indicates a start point of the page that is the first point on the page that image acquisition section 17 reads. Arrow x shown in FIG. 7 indicates the main scanning direction of image acquisition section 17, while arrow y indicates the secondary scanning direction. Recording area B111 shown in FIG. 7 is a rectangle with points P1 and P2 as opposing corners. The x-coordinate indicating the position of point P1 in the main scanning direction is x1, while the y-coordinate indicating the position in the secondary scanning direction is y1. The x-coordinate and y-coordinate of point P2 are x2 and y2, respectively. x1 is smaller than x2 and y1 is smaller than y2. Format information 141 defines each recording area based on the numerical values corresponding to x1, x2, y1, and y2.

3. Operation

Next, the operations of image-processing system 9, particularly the operations of image-processing device 1, will be described.

Figure 8:
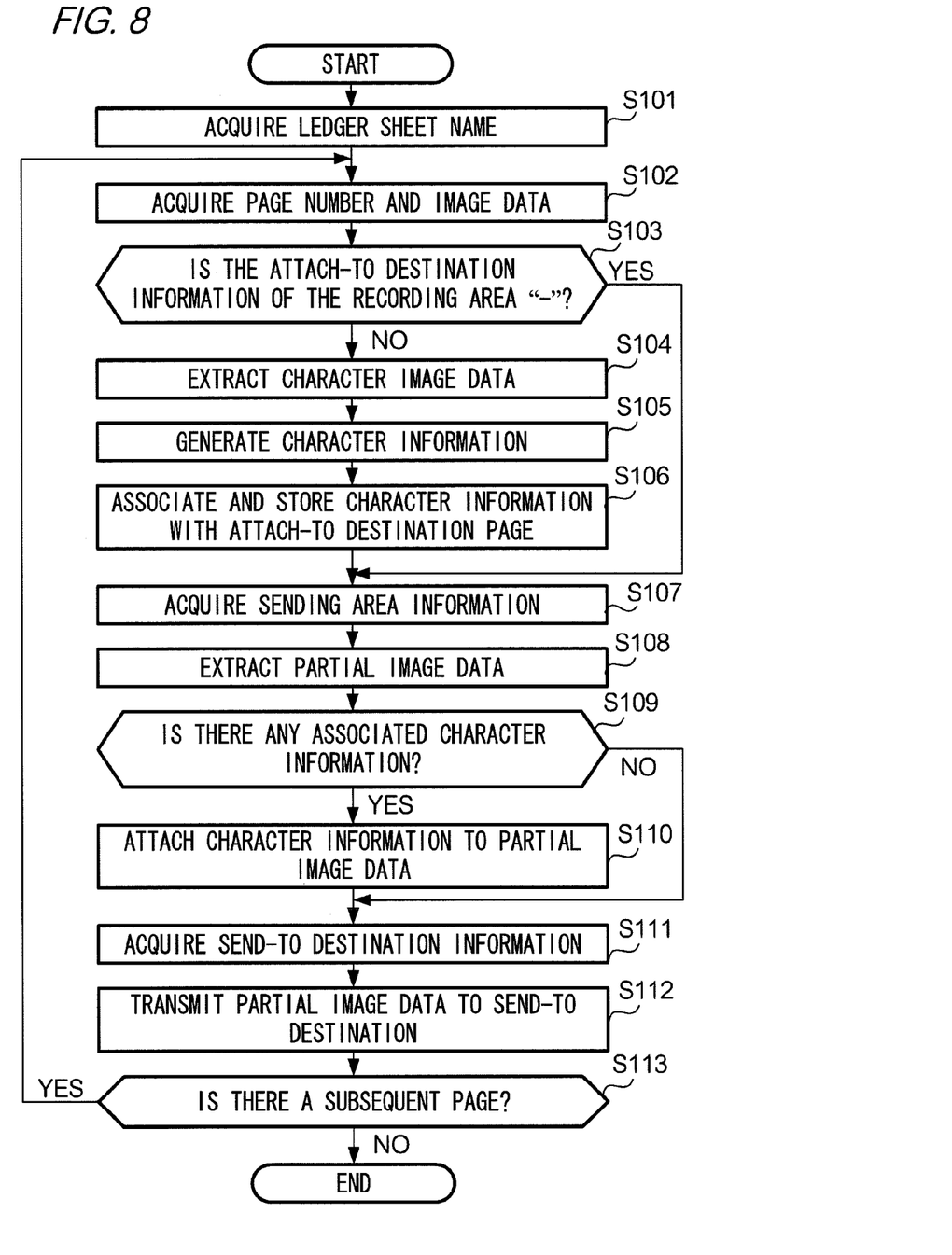
FIG. 8 is a flowchart showing a series of operations for reading a ledger sheet on the image-processing device.

FIG. 8 is a flowchart showing a series of operations for reading a ledger sheet on image-processing device 1. The contents of list of ledger sheet names 1410 are displayed on display 16. When the user selects the ledger sheet name of the ledger sheet to be read by operating the arrow keys and buttons of operating section 15 while observing the display on display 16, CPU 11 acquires and stores the selected ledger sheet name in RAM 13 (step S101). Next, when the user layers and places the pages of the ledger sheet (an example of a document) in order on an auto document feeder (ADF) (not shown) of image acquisition section 17 and operates operating section 15 to issue an instruction to read the ledger sheet, image acquisition section 17, under the control of CPU 11, scans the ledger sheet page by page and associates the image data generated from each scanned page with the page number and sends it to CPU 11. CPU 11 associates the acquired image data with the page number and stores it in RAM 13 (step S102). In other words, image acquisition section 17 and CPU 11 function as an acquiring unit that acquires image data representing a document which includes multiple pages. Moreover, the page indicated by the page number stored in RAM 13 is a specified page (an example of an first page), which is at least one of the multiple pages contained in the ledger sheet, and the image data stored in RAM 13 is image data representing an image of the specified page.

CPU 11 locates the ledger sheet name acquired from list of ledger sheet names 1410 of format information 141 in step S101 and specifies table of area definitions 1411 and table of send-to destination definitions 1412 corresponding to the ledger sheet name. Then, CPU 11 refers to the attach-to destination information field of table of area definitions 1411, acquires the attach-to destination information of each recording area corresponding to the page number of the image data, and determines whether the acquired attach-to destination information is "-" for each recording area (step S103). If it is determined that the acquired attach-to destination information is "-" (i.e., if no attach-to destination is defined for the recording area) (step S103: YES), CPU 11 proceeds to the next step. On the other hand, if it is determined that the acquired attach-to destination information is not "-" (step S103: NO), CPU 11 extracts the data of the rectangle area indicated by the recording-area position information of the recording area (an example of a character area) from the image data as character image data (an example of first partial image data) representing characters (step S104). In other words, CPU 11 functions as an extracting unit that extracts a character area in a specified page, which is one of multiple pages, from image data that is acquired by the acquiring unit. Moreover, if the attach-to destination information determined for each recording area of each page in table of area definition 1411 is not "-", the data of the rectangle area indicated by the recording-area position information of the recording area is character image data contained in an area determined for the specified page. In other words, in this case, CPU 11 functions as an extracting unit that extracts character image data contained in an area determined for the specified page from image data representing the image of the specified page.

Then, by performing a character recognition process, CPU 11 generates character information from the extracted character image data (step S105). In other words, the character information is character information that indicates characters and is obtained by performing the character recognition process for character image data extracted by the extracting unit. Then, CPU 11 associates the generated character information with the specified page while also associating it with each of the attach-to destination pages (an example of a second page) indicated in the attach-to destination information (i.e., pages other than the specified page) to store it in RAM 13 (step S106).

For example, when the first page of the ledger sheet named "Delivery table A" is read, because the attach-to destinations associated with the recording area numbered "1" are "2, 3", CPU 11 generates the character string "Ichiro Fuji" from the character image data of recording area B111 in FIG. 4 that corresponds to the recording area numbered "1", combines the character string with the tag name "Name" of recording area B111, and generates character information composed of the character string "<Name>Ichiro Fuji</Name>". Then, CPU 11 associates the generated character information with both pages 2 and 3 and stores it in RAM 13.

After all of the above processes (i.e., the processes of step S103 to step S106) have been performed for all of the recording areas of the page read by image acquisition section 17, CPU 11 refers to table of send-to destination definitions 1412 and acquires the sending area information defined for the page (step S107). Then, CPU 11 extracts the image data of the recording area with the number indicated in the sending area information from the image data as partial image data (an example of second partial image data) and stores it in RAM 13 (step S108). In other words, the partial image data is image data within a predetermined area in the image data of a certain page.

Next, CPU 11 determines whether the page has any character information with which the page was associated in step S106 (step S109), and if it is determined that there is associated character information (step S109: YES), it attaches the character information to the partial image data (step S110) and advances the process to step S111. On the other hand, if CPU 11 determines that there is no associated character information (step S109: NO), CPU 11 advances the process directly to step S111.

In step S111, CPU 11 refers to table of send-to destination definitions 1412, acquires the send-to destination information defined for the page (step S111), and transmits the partial image data to the send-to destination indicated by the send-to destination information (step S112). Consequently, CPU 11 functions as an output unit that associates character image data extracted by the extracting unit with the image data of the attach-to destination pages and outputs the data to output destinations determined for each attach-to destination page.

Moreover, at this time, if character information is attached to the partial image data, the character information is also sent to the send-to destination along with the partial image data. In particular, if the character information has been associated with the attach-to destination pages indicated in the attach-to destination information (i.e., pages other than the specified page), the partial image data is image data contained in a predetermined area within the image data of the pages other than the specified page. Consequently, CPU 11 functions as an output unit that outputs character information indicating characters determined by performing the character recognition process for character image data extracted by the extracting unit by associating the information with image data within a predetermined area in the image data of the attach-to destination pages, wherein the predetermined area has been determined according to the position of the character image data in the specified page.

Then, CPU 11 determines whether there is a subsequent page in the ledger sheet (step S113), and if it determines that there is a subsequent page (step S113: YES), it returns the process to step S102. On the other hand, if it determines that there is no following page (step S113: NO), CPU 11 ends the process.

For example, in the sending area information defined for the first page, the recording area numbers "1, 10" are described. These correspond to, for example, recording areas B111, B151 shown in FIG. 4. Recording areas B111, B151 are areas superimposed with seal areas B110, B150, which are areas where seal impressions are made as described above. The seal impressions of the seal areas are not recognized in the character recognition process, and therefore, a determination cannot be made for a seal impression based on the character information obtained in the character recognition process. Separately from the character information that is the result of the character recognition, CPU 11 associates and stores the partial image data that is the image data of these recording areas with each page, and therefore, information that is missing from the character information is compensated for by the partial image data.

As described above, image-processing system 9 is able to associate and process character image data that represents characters and is contained in an image of at least one of multiple pages with partial image data contained in images of other pages. Characters duplicated in a duplicate voucher often become faded or unclear compared to the original characters due to, for example, variations in pen pressure or variations in sensitivity of pressure sensitive paper. When a character recognition process is performed for such faded or unclear characters, there is a high possibility that characters will be misrecognized. In image-processing system 9, when, for example, a duplicate voucher is read, partial image data of a page containing duplicate characters, wherein character information representing the original characters has been attached to the data, is output to external processing device 2 processing the page. Consequently, image-processing system 9 allows for reductions in the time and resources required for processing by reusing the results of the first character recognition process performed for the original characters for the duplicate characters. Moreover, image-processing system 9 allows for reductions in instances of character misrecognition by performing the character recognition process for the original characters, which are clearer than the duplicate characters.

In addition, in the exemplary embodiment described above, seal impressions are made at the recording areas. However, the present invention is not limited to this exemplary embodiment. For example, signatures or thumb prints may be made at the recording areas, instead of seal impressions. In this case, the seal areas described above are superimposed over the recording areas as signature areas or thumb print areas.

4. Modifications

The above is a description of an exemplary embodiment, but the details of this exemplary embodiment may be modified as follows. Moreover, the following modifications may also be combined.

(1) MODIFIED EXAMPLE 1

In the exemplary embodiment described above, when CPU 11 determines that there is character information that has been associated with a specified page, it attaches the character information to partial image data for that page, but CPU 11 may attach the character image data instead of the character information. In this case, the character recognition process may be performed at the send-to destination. For example, when external processing device 2 receives the character image data attached to the partial image data and sent from image-processing device 1, a CPU of external processing device 2 may generate character information by performing the character recognition process for the character image data. In other words, CPU 11 may function as an output unit that associates and outputs the character image data extracted by the extracting unit with the image data of the attach-to destination pages, wherein the image data is determined according to the position of the image data in the specified page.

In addition, in the exemplary embodiment described above, the attach-to destination information contains a description other than "-" for only one page (i.e., there is only one specified page), but the attach-to destination information of the second and subsequent pages may contain descriptions other than "-". In this case, the pages defined as non-specified pages when the first page is the specified page may also be used as the specified page.

(2) MODIFIED EXAMPLE 2

In the exemplary embodiment described above, when CPU 11 determines that there is character information that has been associated with the partial image data of a page other than the specified page, it attaches the character information to the partial image data, but it may attach the character information directly to the image data of the page other than the specified page. In other words, CPU 11 may function as an output unit that associates and outputs the character image data extracted by the extracting unit with the image data of the attach-to destination pages, wherein the image data is determined according to the position of the character image data in the specified page.

(3) MODIFIED EXAMPLE 3

Image acquisition section 17 may read image data of a specified page and non-specified pages with differing resolutions. As character recognition becomes more accurate when the resolution of the image data undergoing the character recognition process is high, image data read at a high resolution is more suitable for use as character image data than image data read at a low resolution. Consequently, in this case, under the control of CPU 11, image acquisition section 17 reads the specified page from which the character image data is extracted at a higher resolution compared to the non-specified pages to generate image data.

(4) MODIFIED EXAMPLE 4

Moreover, image acquisition section 17 may read the image data of the specified page and the non-specified pages with differing tones. The character recognition process may be performed even for black-and-white images represented in two tones of black and white, for example. By setting the image data to a low tone, the communication load may be reduced and storage capacity may be saved. On the other hand, because the partial image data is used for confirming seal impressions and the like as described above, higher tones are more suitable for confirmation, and in the case of a black-and-white image in which color information is missing, for example, this objective of confirming seal impressions may not be achieved. Consequently, in this case, under the control of CPU 11, image acquisition section 17 reads the specified page from which the character image data is extracted at a lower tone compared to the non-specified page to generate image data.

(5) MODIFIED EXAMPLE 5

In the exemplary embodiment described above, table of send-to destination definitions 1412 describes send-to destination information, which is information that specifies output destinations determined for each page, but the output destinations may not be determined for each page. In other words, CPU 11 may associate and output the character image data extracted by the extracting unit with the image data of a page other than the specified page, wherein the image data is determined according to the position of the character image data in the specified page.

(6) MODIFIED EXAMPLE 6

In the exemplary embodiment described above, CPU 11 acquires the ledger sheet name selected by the user and identifies the format of the acquired image data, but the format of the acquired image data may be identified automatically by analysis of the image data itself. In this case, memory 14 stores format information representing formats of multiple types of pages. In other words, memory 14 is an example of a format-information memory that stores format information representing the formats of multiple types of pages. Then, when CPU 11 acquires image data from image acquisition section 17, it performs analyses such as a labeling process for the acquired image data and obtains the format information of the image data based on positions and arrangement of ruled lines and other lines. CPU 11 may then perform a pattern matching process or the like for the obtained format information using the format information of the formats stored in memory 14 to identify the format of the page represented by the image data. In other words, CPU 11 functions as a format identification unit that analyzes the image data acquired by the acquiring unit, obtains the format information representing the format of the page represented by the image data, compares the format information with the format information stored by the format information memory, and identifies the format of the page. In addition, the details described in a predetermined area may be used for identifying the format of each item of image data. Specifically, for example, the format may be identified by analysis of the details described in page display areas B10, B20, B30.

(7) MODIFIED EXAMPLE 7

When modified example 1 and modified example 2 described above are combined, CPU 11 functions as an output unit that associates and outputs the character image data extracted by the extracting unit with the image data of a page other than the specified page, wherein the image data is determined according to the position of the character image data in the specified page, but CPU 11 may replace the character image data in the specified page with image data obtained from a non-specified page (an example of third partial image data), which is contained in an area corresponding to the position. In other words, CPU 11 functions as an output unit that outputs character image data extracted by the extracting unit substituted for image data within an area corresponding to a position of the character image data in the image data of the attach-to destination pages.

(8) MODIFIED EXAMPLE 8

In the exemplary embodiment described above, CPU 11 sends a partial image of a page each time it scans a single page, but it may perform the sending process after scanning a single ledger sheet as a set.

Moreover, in the exemplary embodiment described above, table of send-to destination definitions 1412 describes the identification information of external processing device 2 as the send-to destination information, but table of send-to destination definitions 1412 may describe the identification information of each of multiple divided storage areas in memory 14 as the send-to destination information. The identification information of each of multiple divided storage areas may be, for example, a URL, a file path, or a physical address. In this case, for each page, CPU 11 stores the image data of the page and the attached character information in each storage area indicated by the identification information described in the send-to destination information of table of send-to destination definitions 1412. Then, image-processing device 1 may configure the authorization settings of each external processing device 2 for retrieving the image data from each of the storage areas. In this case, the identification information of external processing device 2 may be associated with the identification information in the storage areas.

(9) MODIFIED EXAMPLE 9

Each program executed by CPU 11 of image-processing device 1 may be stored and provided on a computer-readable storage medium, such as, for example, a magnetic recording medium such as a magnetic tape or a magnetic disk, an optical recording medium such as an optical disk, a magneto-optical medium, or a semiconductor memory. Moreover, the programs may also be downloaded through a network such as the Internet. In addition, the controller for performing such control operations may be any of various devices other than a CPU, such as, for example, a dedicated processor.

Moreover, external equipment connected through communication section 18 may be used for memory 14, operating section 15, display 16, and image acquisition section 17. In this case, CPU 11 may control each external device through communication section 18.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device comprising:
   an acquiring unit that acquires image data representing a document which includes a plurality of pages;
   an extracting unit that extracts, from the acquired image data, a character area in a first page that is at least one of the plurality of pages; and
   an output unit that transmits the acquired image data of a second page and first partial image data within the extracted character area to a send-to destination,
   wherein the second page is different from the first page, the second page having a character area which corresponds to the extracted character area of the first page, the second page being a sheet made of pressure sensitive paper, characters entered in the extracted character area being duplicated in the character area of the second page.

2. The image-processing device according to claim 1, wherein the output unit transmits character information that represents a character generated by a character recognition process applied to the first partial image data and that is associated with the acquired image data of the second page.

3. The image-processing device according to claim 2, wherein the acquiring unit acquires first image data of the first page that is read at a certain resolution, and second image data of a page other than the first page that is read at a lower resolution than the certain resolution.

4. The image-processing device according to claim 1, wherein the acquiring unit acquires first image data of the first page that is read at a certain tone, and second image data of a page other than the first page that is read at a higher tone than the certain tone.

5. The image-processing device according to claim 1, wherein the output unit transmits the first partial image data associated with the acquired image data of the second page to an output destination determined for the first page.

6. The image-processing device according to claim 1, further comprising:
- a memory that stores format information representing a format of a plurality of types of pages; and
- an identifying unit that analyzes the acquired image data, determines format information of a format of a page represented by the image data, compares the format information with the format information stored in the memory, and identifies a format of the page, and wherein
the extracting unit extracts, from the acquired image data, a character area determined for the identified format.

7. The image-processing device according to claim 1, wherein the extracting unit extracts, from the acquired image data, a character area determined for the first page.

8. The image-processing device according to claim 1, wherein the output unit transmits the first partial image data associated with second partial image data within a predetermined area in the second page.

9. The image-processing device according to claim 1, wherein the output unit transmits the first partial image data substituted for third partial image data within the character area in the second page corresponding to the extracted character area of the first page.

10. The image-processing device of claim 1, wherein the character area of the second page has second partial image data that represents the duplicated characters before the output unit transmits the first partial image data.

11. An image-processing method comprising:
- acquiring image data representing a document which includes a plurality of pages;
- extracting, from the acquired image data, a character area in a first page that is at least one of the plurality of pages; and
- transmitting the acquired image data of a second page and first partial image data within the extracted character area to a send-to destination,
- wherein the second page is different from the first page, the second page having a character area which corresponds to the extracted character area of the first page, the second page being a sheet made of pressure sensitive paper, characters entered in the extracted character area being duplicated in the character area of the second page.

* * * * *